United States Patent [19]
Glaesener et al.

[11] Patent Number: 5,302,109
[45] Date of Patent: Apr. 12, 1994

[54] CLAMP MECHANISM EMPLOYING A BRAKE UNIT

[75] Inventors: Pierre Glaesener, Bissen, Luxembourg; Robert D. Schad, Toronto, Canada

[73] Assignee: Husky Injection Molding Systems Ltd., Bolton, Canada

[21] Appl. No.: 16,458

[22] Filed: Feb. 11, 1993

Related U.S. Application Data

[62] Division of Ser. No. 780,159, Oct. 21, 1991, Pat. No. 5,230,911.

[51] Int. Cl.⁵ .............................................. B29C 45/64
[52] U.S. Cl. ................................. 425/595; 425/214; 425/451.9
[58] Field of Search ............. 425/214, 406, 450.1, 425/451.2, 451.9, 589, 590, 595, DIG. 221; 100/219

[56] References Cited

U.S. PATENT DOCUMENTS

| | | | |
|---|---|---|---|
| 3,674,386 | 7/1972 | Orth | 425/214 |
| 4,017,236 | 4/1977 | Penkman et al. | 425/150 |
| 4,230,442 | 10/1980 | Rees et al. | 425/451.2 |
| 4,565,517 | 1/1986 | Brinkmann et al. | 425/595 |
| 4,867,938 | 9/1989 | Schad et al. | 264/297.2 |
| 4,904,177 | 2/1990 | Chiesi | 425/451.9 |
| 5,129,817 | 7/1992 | Ing et al. | 425/451.9 |
| 5,133,655 | 7/1992 | Schad et al. | 425/150 |

FOREIGN PATENT DOCUMENTS 1071199  6/1967  United Kingdom .

*Primary Examiner*—Jay H. Woo
*Assistant Examiner*—James P. Mackey
*Attorney, Agent, or Firm*—Bachman & LaPointe

[57] ABSTRACT

The present invention relates to an improved clamping mechanism for use in injection molding machines and similar pieces of equipment where it is desired to apply a clamping force to particular components. The clamping mechanism of the present invention employs at least one spaced apart brake plate mounted to one component and a braking unit for engaging the brake plates. The braking unit has at least one pair of brake pad linings surrounding the brake plates and at least one piston-cylinder unit for causing frictional engagement between the respective brake pad linings and the brake plate(s). When the brake pad linings grip the brake plate(s), the braking unit becomes locked to the components to which the brake plate(s) are attached. The clamping mechanism of the present invention may be employed on simple injection molding machines as well as TANDEM ® injection molding machines.

8 Claims, 8 Drawing Sheets

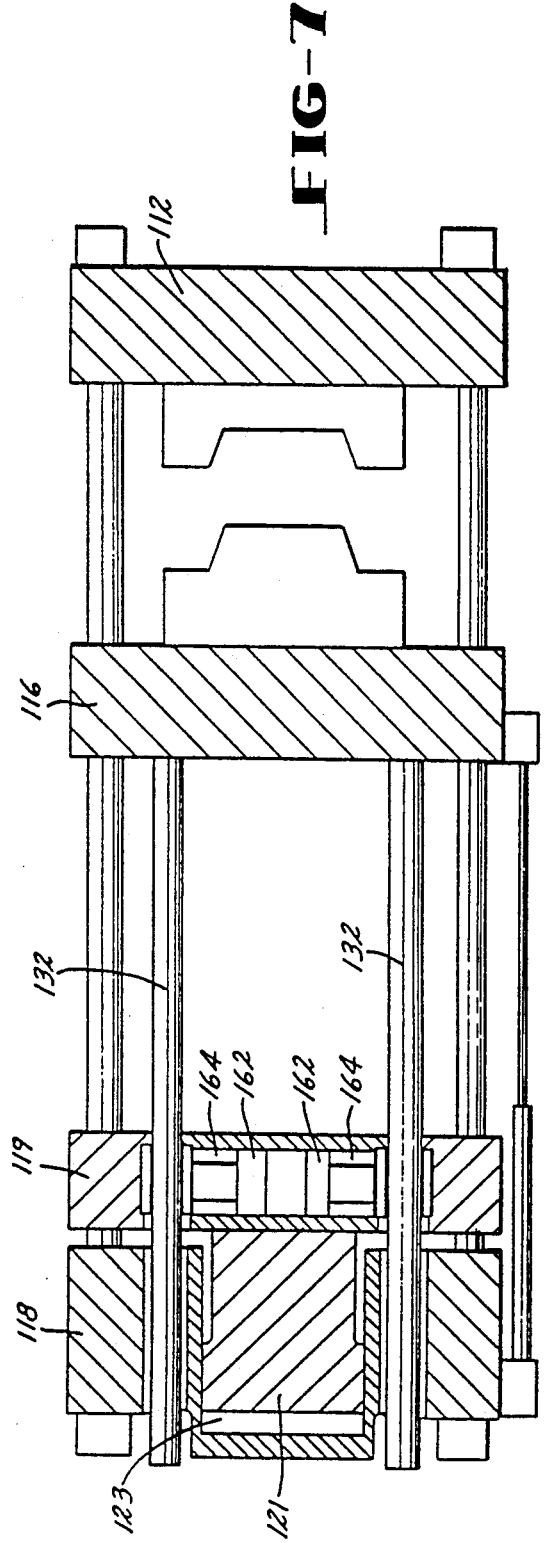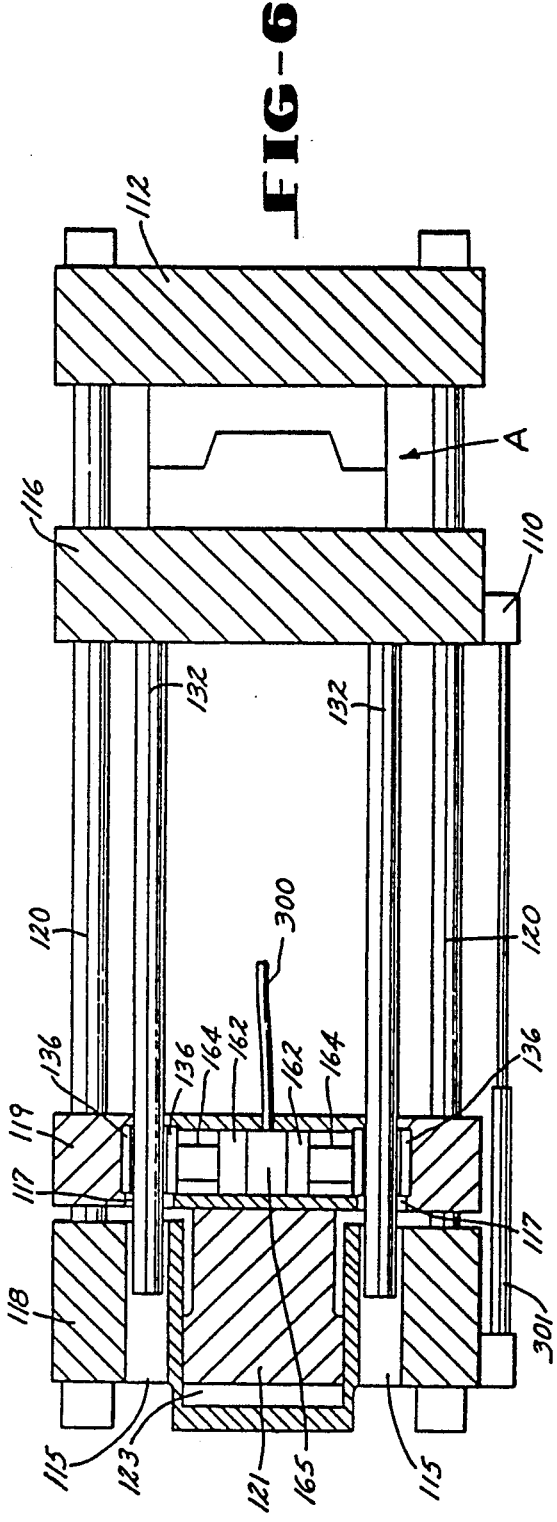

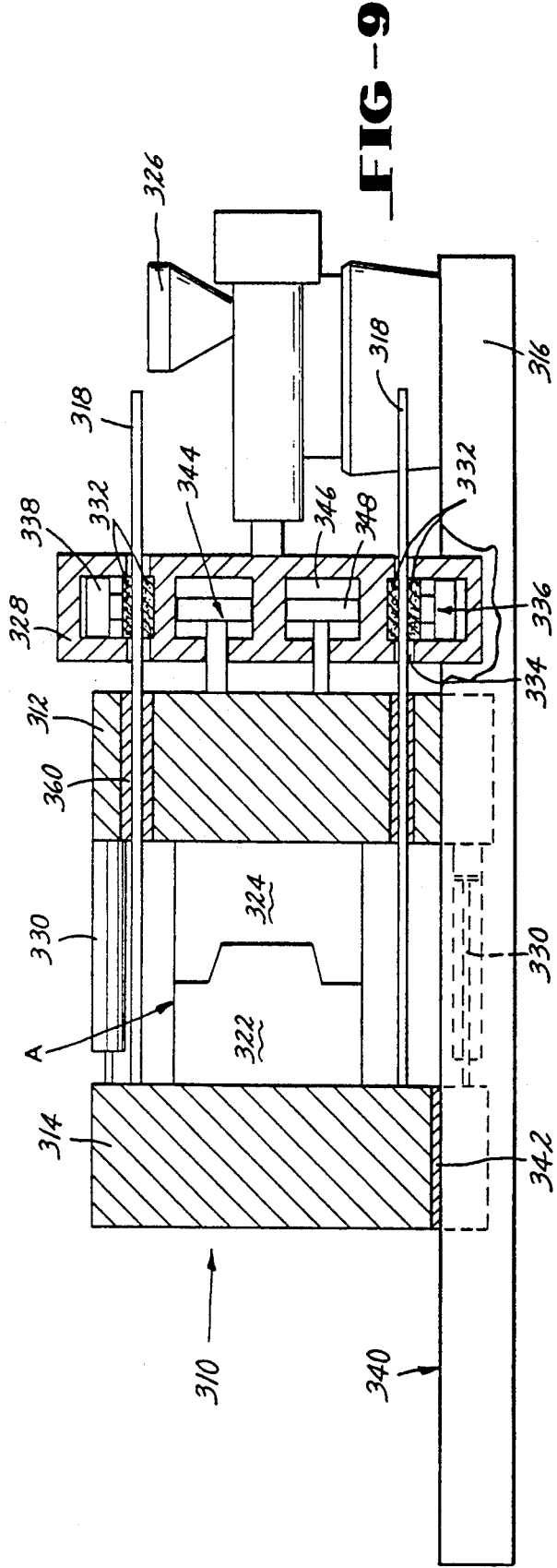
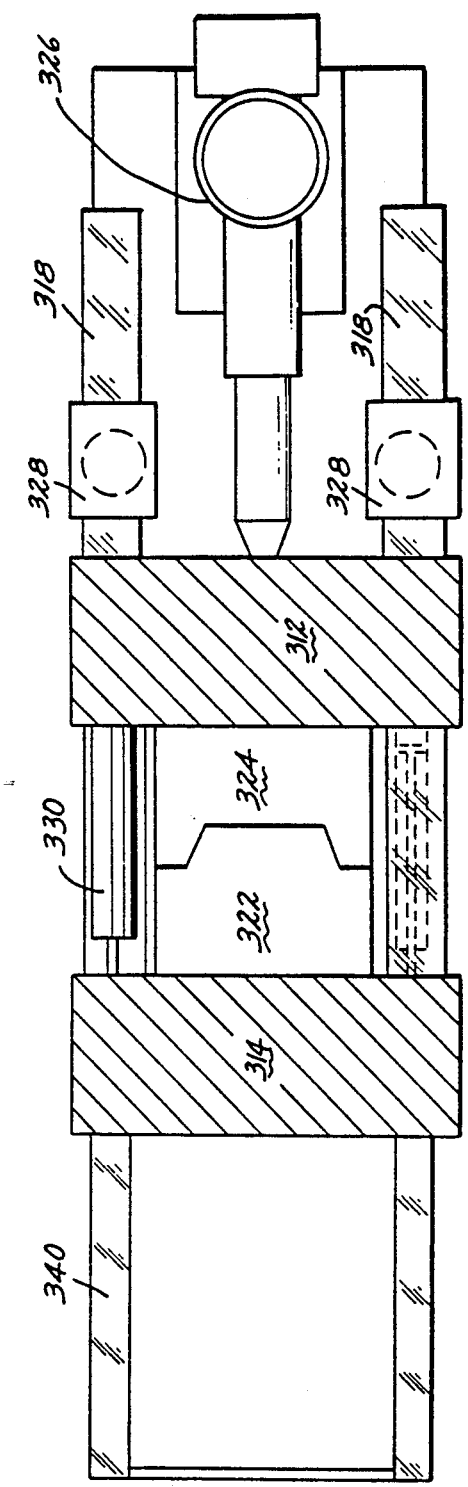

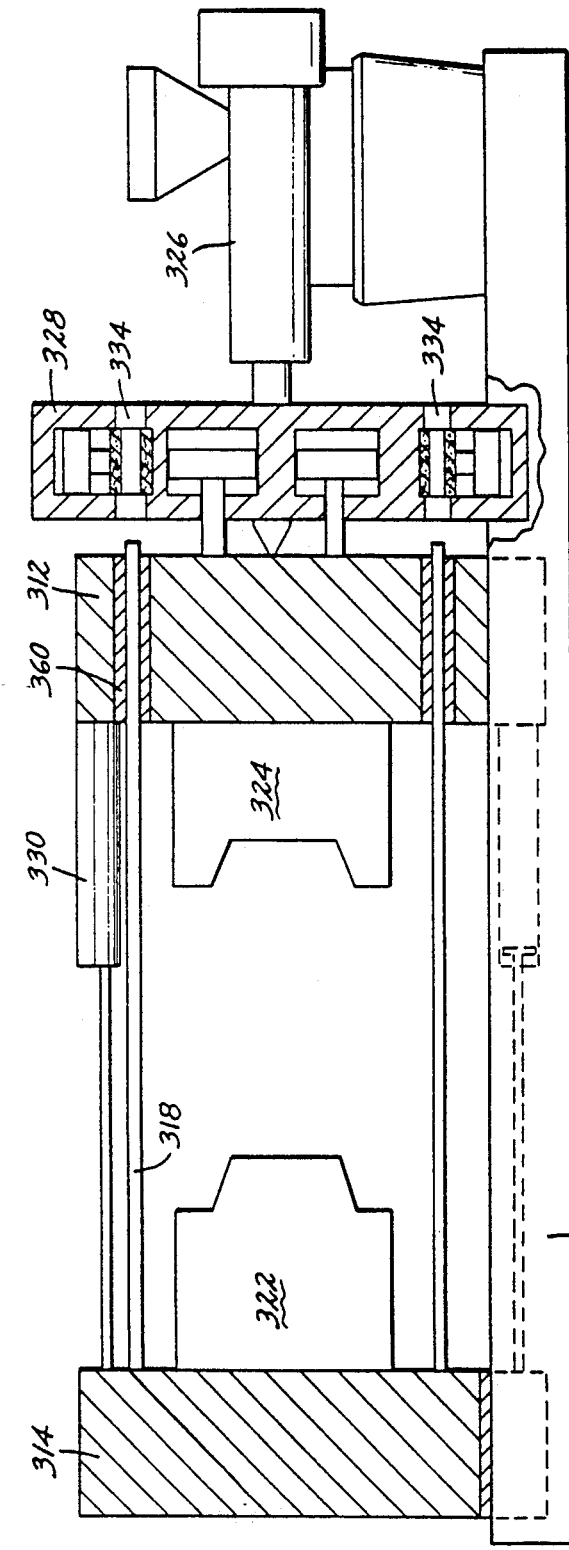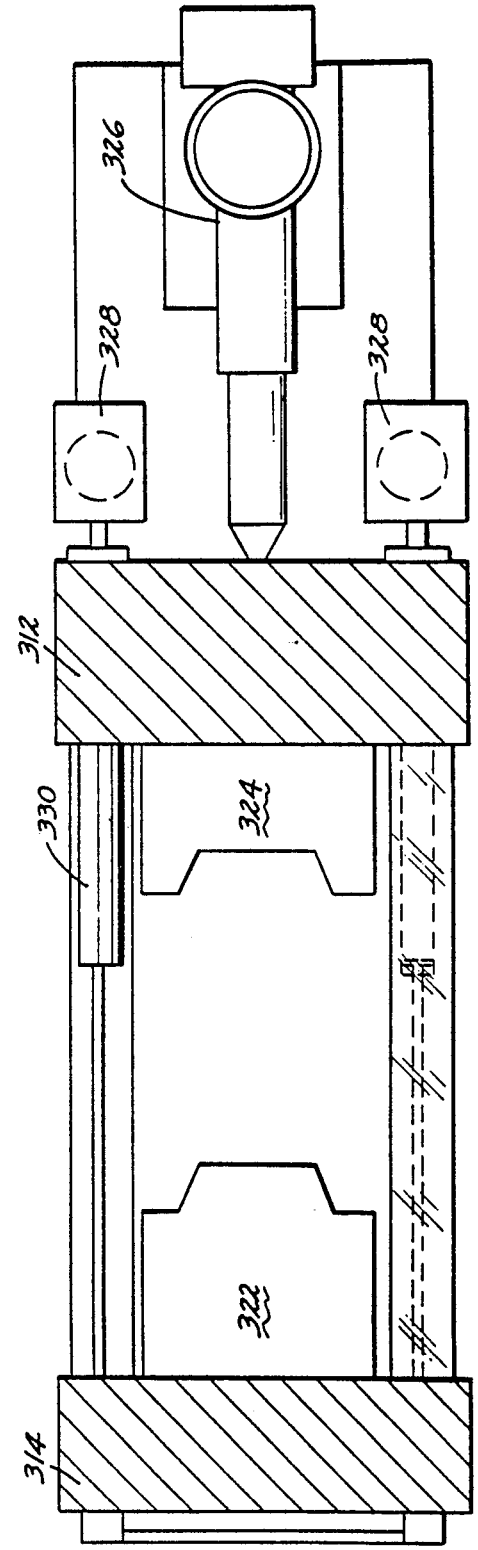

CLAMP MECHANISM EMPLOYING A BRAKE UNIT

This is a division of application Ser. No. 780,159 filed Oct. 21, 1991, now U.S. Pat. No. 5,230,911.

BACKGROUND OF THE INVENTION

The present invention relates to injection molding machines and to an improved clamp mechanism for use therein.

Injection molding machines having hydraulically actuated and clamped platens are known in the art. Typically, these machines work on the principle of two separate hydraulic circuits, one to open and close the clamp and the second to generate the clamping force between the closed platens.

Some prior art machines employ a system wherein a column attached to a moving platen is blocked against the clamp piston by shutters. U.S. Pat. Nos. 4,017,236 to Penkman and 4,230,442 to Rees illustrate such a system. A gripper bushing system for blocking the column against the clamp piston is shown in co-pending U.S. patent application Ser. No. 637,814, filed Jan. 7, 1991 to Ing, now U.S. Pat. No. 5,133,655. U.S. Pat. No. 4,867,938 to Schad uses a gripper bushing system to control alternative movement of platens so that the two molding stations in the injection molding system are operated sequentially. Both these systems suffer from disadvantages which affect the performance of the clamp mechanism.

The shutter type of clamp must wait for the shutters to be interposed between the column and clamp piston before the clamp can be energized. This finite period of time during both clamp up and unclamp extends the molding cycle. Typically, shutter speed is about 0.5 seconds in each direction. As a result, approximately 1 second of the molding cycle time is waiting for shutter actuation.

The gripper style of clamping mechanism requires very high oil pressures to be generated in order to actuate the gripping bushing. Typically, 7-8,000 psi oil pressure must be used, whereas all other machine hydraulic requirements are typically 2,200 psi. This higher pressure requirement adds cost to the machine.

Additionally, gripper devices suffer from premature wearing of bushing and column surfaces. Still further, close tolerances between the bushing and the column are required. This adds cost to the clamp construction and to its maintenance.

Very large clamp mechanisms, more than 1,000 tons, mean that clamp blocking shutters or gripping bushings become very large and their disadvantages become more than proportionally counterproductive.

Accordingly, it is an object of the present invention to provide an improved clamping mechanism which reduces cycle time by decreasing clamp wait time.

It is a further object of the present invention to provide a clamping mechanism as above which operates at normal hydraulic pressures and clearances.

It is yet a further object of the present invention to provide a clamping mechanism as above whose capacity can be increased simply and without incurring major cost or cycle penalties.

It is yet a further object of the present invention to provide a clamp mechanism as above which may be used on a wide variety of machines including but not limited to injection molding machines and vertical presses.

Still another object of the present invention is to eliminate the need for an independent mold shutheight adjustment means.

Other objects and advantages of the present invention will become clearer from the following description and drawings.

SUMMARY OF THE INVENTION

The foregoing objects are achieved by the clamp mechanism of the present invention which comprises at least two brake plates mounted to a component such as a moving platen and at least one brake unit for engaging the brake plates. Each brake unit has one or more pairs of brake pad linings forming passageways through which the brake plates may slide and at least one piston-cylinder unit for causing frictional engagement between the brake pad linings and sides of the brake plates. When actuated, the brake unit becomes locked to the brake plates allowing a clamping force generated by a clamping unit to be transmitted to the component via the brake plates.

The brake pad linings employed in the present invention are conventional brake pads such as those used in automobile brake systems. Preferably, they are maintained in position by carrier plates within the brake unit.

The clamp mechanism of the present invention may be employed in a wide variety of machines. For example, it may be employed in TANDEM ® injection molding machines where it is desired to selectively open and close adjacent mold portions. It may also be employed in simple molding machines where it is desired to apply a clamping force to a moving platen. Still further, it may be employed in a novel injection molding machine wherein the brake plates replace tiebars.

Further details of the present invention are set out in the following description and drawings wherein like reference numerals depict like elements.

BRIEF DESCRIPTION OF THE DRAWINGS

FIG. 6 is a view in partial cross section of an injection molding machine employing the clamping mechanism of the present invention;

FIG. 7 illustrates the injection molding machine of FIG. 6 in a clamp open position;

FIG. 9 is a side view of an injection molding machine in partial section showing yet another embodiment of the clamping mechanism of the present invention;

FIG. 10 is a top view of the injection molding machine of FIG. 9;

FIG. 11 is a side view similar to that of FIG. 9 showing the mold in a mold open position; and FIG. 12 is a top view similar to that of FIG. 10 showing the mold in a mold open position.

DETAILED DESCRIPTION

Figure 1:
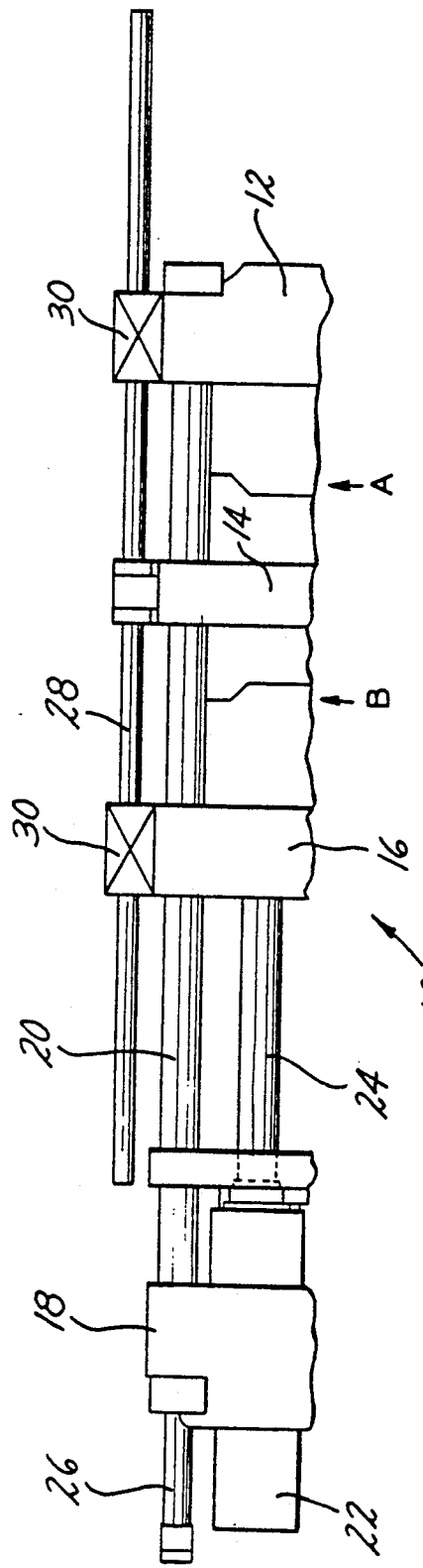
FIG. 1 illustrates a prior art gripper system employed on a TANDEM ® injection molding machine.

FIG. 1 illustrates a prior art TANDEM ® injection molding machine 10 consisting of a stationary platen 12, a center platen 14 and a moving platen 16. A first mold A is formed between the stationary platen 12 and the center platen 14 by a first set of mold halfs affixed to the platens 12 and 14. A second mold B is formed between the center platen 14 and the moving platen 16 by a second set of mold halfs affixed to the platens 14 and 16. The machine 10 further consists of a clamp block 18 and a plurality of tiebars 20 extending between the clamp block 18 and the stationary platen 12. The center platen 14 and the moving platen 16 slide along the tiebars between a mold open position and a mold closed position.

A clamping unit 22 is provided which consists of a piston and cylinder. The clamping unit 22 acts on one or more columns 24 attached to the moving platen 16 to clamp the molds A and B when they are in a closed position. If desired, multiple clamp units 22 can be employed. Stroke cylinders 26 are provided to cause the moving platen 16 to move with respect to the clamp block 18.

In order to open and close the two molds A and B independently, "grippers" 30 mounted on the moving platen 16 and the stationary platen 12 alternately grip a rod 28 mounted to the center platen 14, such that when the stationary platen gripper is activated and the moving platen gripper is released, the mold B is allowed to open and close while the mold A remains closed. Similarly, when the moving platen gripper is activated and the stationary platen gripper is released, the mold A is allowed to open and close while the mold B remains closed.

FIG. 1 illustrates a prior art gripper method wherein a gripper shaft 28 is fixed to the side of the center platen 14. The gripper shaft extends beyond the length of the clamping unit 22. Gripper bushings 30 mounted on the moving and stationary platens 12 and 16, through which the shaft 28 slides, are used to grip the shaft. The gripper bushings includes bushes (not shown) which deflect inwardly to grip the outer surface of the shaft 28 by frictions. Deflection of the bushes to accomplish their gripping function is caused by the introduction of high pressure fluid. The clearance between the shaft's outer surface and the bushing's inner surface is very small to minimize the amount of deflection of the inner surface. Typically, the clearance is on the order of 0.010" to 0.020". In order to minimize misalignment between the rod and bush, the shaft does not disengage from the bushing at any stroke position of the platens. It has been learned that the re-engagement of a short shaft can cause severe damage to the bushing because of the limited available clearance. Consequently, the shaft which is employed is longer than the clamp unit in order not to disengage from the bushings.

Figure 2:
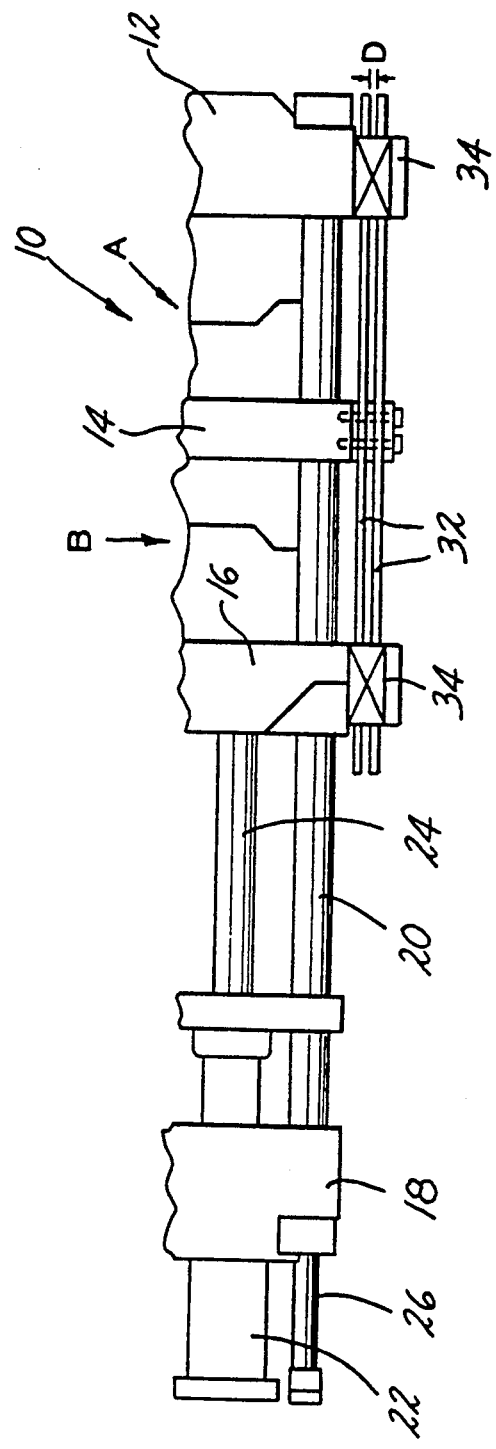
FIG. 2 illustrates a TANDEM ® injection molding machine employing the improved clamping mechanism of the present invention.

FIG. 2 illustrates a TANDEM ® injection molding machine employing the improved clamping mechanism of the present invention. As can be seen from this Figure, all the components of the TANDEM ® machine are identical except for the omission of the gripper shaft 28 and the gripper bushings 30. In lieu of these elements, the machine of FIG. 2 has brake plates 32 mounted to the side of the center platen 14 and brake units 34 mounted to the sides of stationary and moving platens 12 and 16 for gripping the brake plates. While it is preferred to mount two brake plates to the side of the center platen, a single plate may be used for low tonnage machines where less surface area for a brake pad is needed.

As can be seen from FIG. 2, the brake plates 32 are spaced apart by a desired distance. Additionally, the brake plates extend in a direction substantially parallel to the axial direction of movement of the moving platen 16 and the center platen 14 as they move between the mold open and closed positions.

Figure 3:
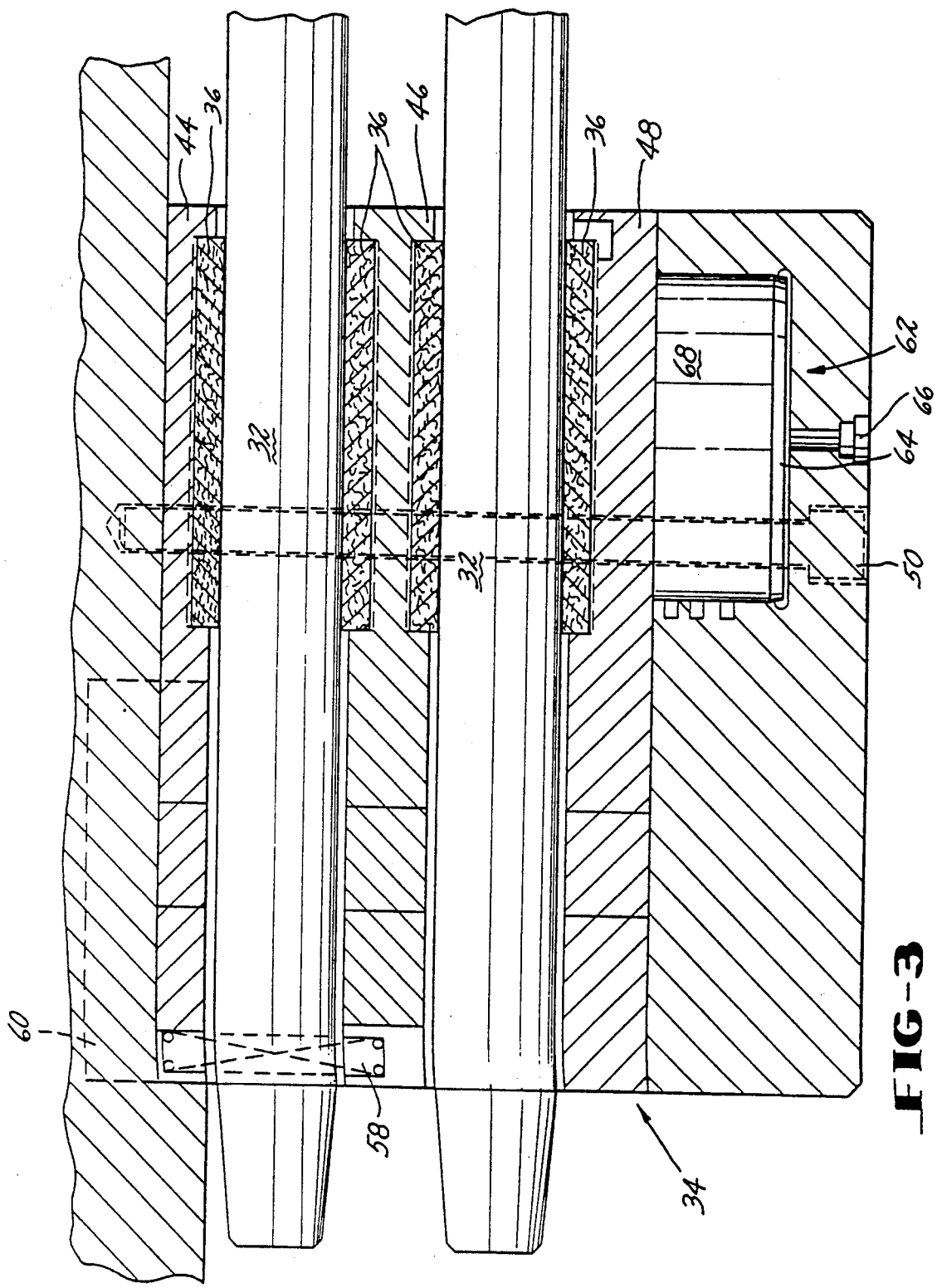
FIG. 3 is a sectional view of a braking unit employed in the clamping mechanism of the present invention.
Figure 4:
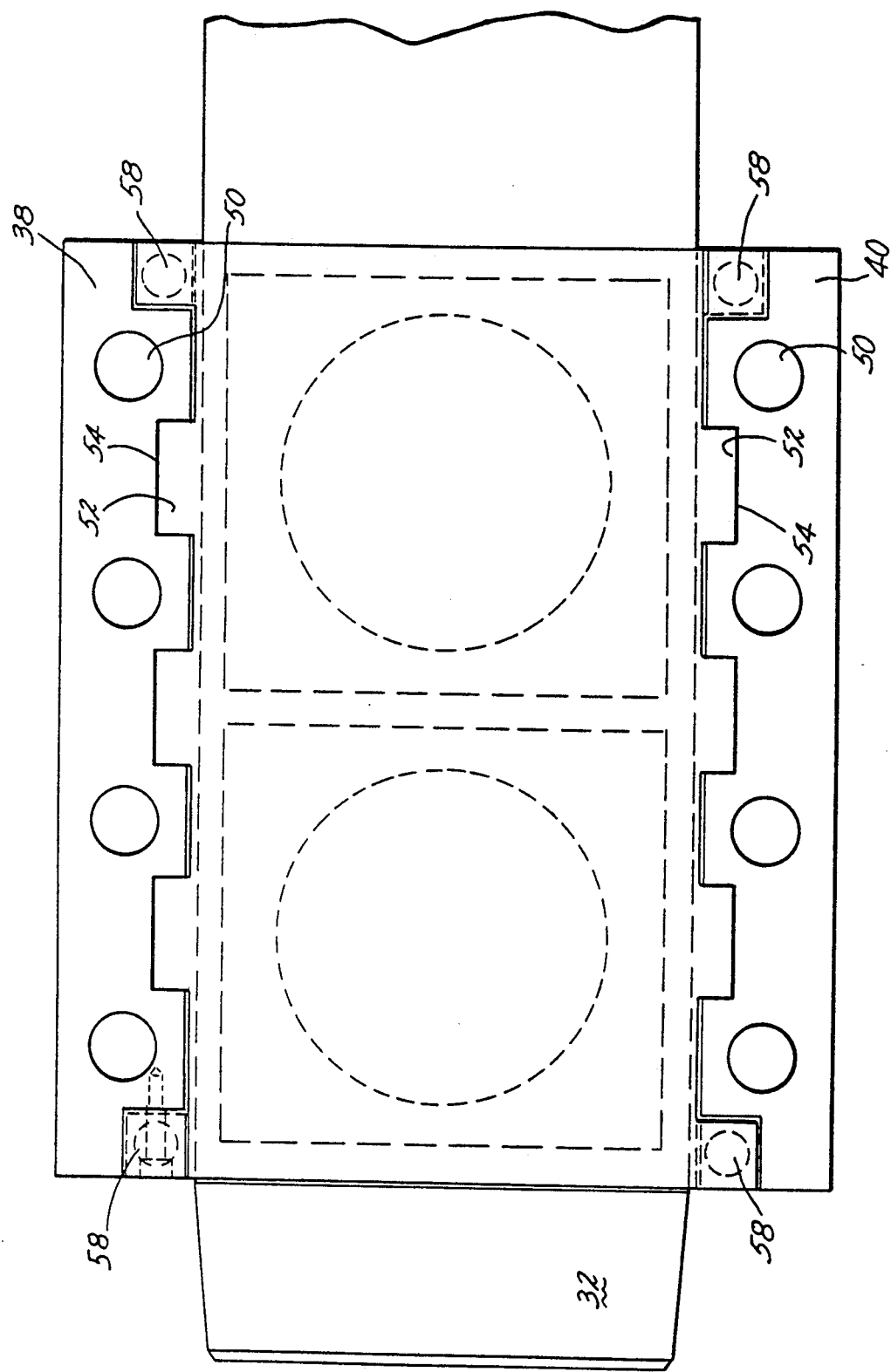
FIG. 4 is a side view of the braking unit shown in FIGS. 2 and 3.
Figure 5:
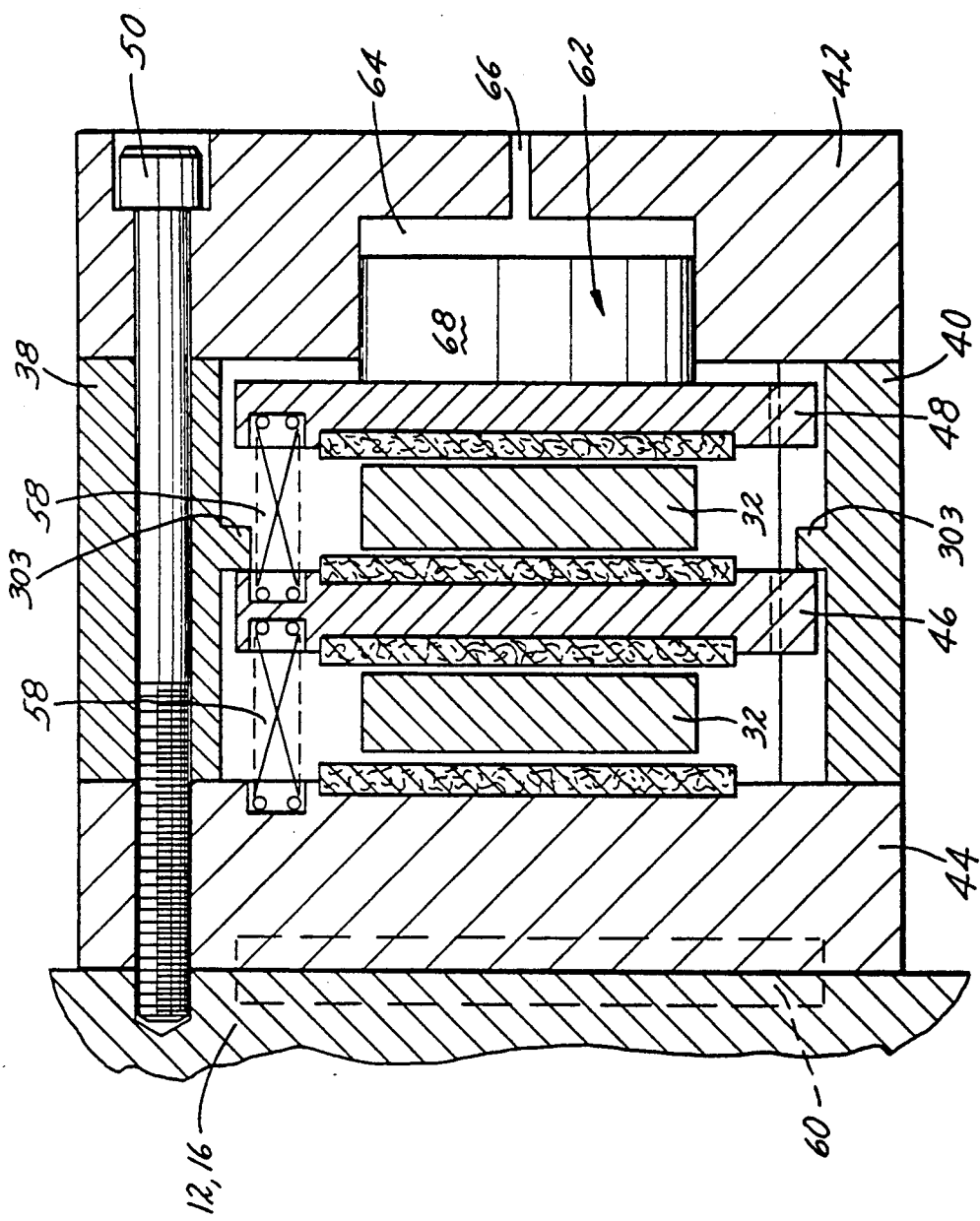
FIG. 5 is another sectional view of the braking unit shown in FIGS. 2-4.

FIGS. 3–5 illustrate the construction of the brake units 34. As can be seen from these figures, the brake plates 32 pass through two passageways in each brake unit defined by brake pad linings or wear pads 36. The brake pad linings 36 employed in the unit 34 may be conventional brake pad linings used in conventional braking systems.

Each brake unit 34 include a housing formed by a top frame member 38, a bottom frame member 40, an end plate 42 and a fixed carrier plate 44. The frame members 38 and 40, the end plate 42 and the fixed carrier plate 44 are held together by bolts 50.

Each brake unit further includes movable carrier plates 46 and 48. The fixed carrier plate and the movable carrier plates hold the replaceable brake pad linings 36. The movable carrier plates have extended portions 52 that engage grooves 54 cut in the top and bottom frame members. It should be noted that other fixing means beside those shown herein can be used.

As can be seen from these figures, the carrier plates 44, 46 and 48 define two passageways or slots 56 through which the brake plates 32 can move. In order to facilitate such movement, the carrier plates are constantly urged apart by springs 58 at their corners.

Referring now to FIG. 5, stop blocks 303 and part of frames 38 and 40 control the relaxed position of carrier plate 46 such that it is centered to equalize the clearances between the brake plates 32 and the wear pads 36.

The entire brake unit 34 may be affixed to the sides of the moving platen 16 and the stationary platen 12 using any suitable means known in the art. Preferably, they are keyed 60 and screwed to the platens 12 and 16.

Each brake unit further includes at least one piston-cylinder unit 62 in the end plate 42. High pressure fluid is supplied to the cylinder 64 portion of each unit by a fluid passageway 66. When fluid is introduced into the cylinder, the piston 68 moves in a direction transverse to the axial direction along which the platens 14 and 16 and the attached brake plates 32 move. When activated by high pressure fluid, the piston 68 moves against the movable carrier plate 48 and the movable carrier plate 46. This causes the movable carriers and the brake pad linings to frictionally engage and grip the sides 70 of the brake plates 32. This in turn clamps the movable carriers and the brake plates to the side of the platen 12 or 16, thus locking the platen's position relative to the brake plate. When a moving force is transmitted to the moving platen 16, by stroke cylinders 26, it can be effectively transferred to the molds via the brake plates 32 and the brake units 34.

When one of the molds must remain closed and clamped to retain residual packing pressure therein during the cooling phase of the cycle, the appropriate brake unit is activated to grip the brake plate and keep the mold closed and clamped before the main clamp unit 22 is released. The brake unit thus continues to maintain the clamping force on the mold imparted to it by the main unit 22.

There are numerous advantages to the clamping mechanism of the present invention. For example, the brake plates 32 can completely disengage from the brake units 34 by virtue of the relatively large clearances between the brake plates and the brake pad linings. As a result, much shorter brake plates can be used when compared to the earlier gripper shafts. Furthermore, the gripping force can be greatly increased by using multiple plates and braking pistons. While the disclosed clamping mechanism uses two brake plates and two pistons per brake unit, this could be increased for larger machines to generate higher gripping forces or reduced for smaller machines. The earlier gripper bushing method was severely limited to the amount of gripping force that could be generated. Still further, the replaceable brake pad liner feature of the present invention makes the brake units much more serviceable than the earlier gripper bushings.

Another advantage of the present invention is the elimination of the need to provide means for mold shutheight adjustment.

Referring now to FIGS. 6 and 7, the present invention is shown as it can be applied to the clamp mechanism of a conventional two platen injection molding machine. The molding machine 110 has a stationary platen 112 and a moving platen 116. A mold A is formed between the platens 112 and 116 by mold halves affixed to the platens.

Two or more brake plates 132 are mounted to a rear surface of the moving platen 116. The brake plates 132 pass through slots 115 cut in the main clamp block 118 and slots 117 in the brake housing 119. The brake housing 119 slides along tiebars 120 extending between the clamp block 118 and the stationary platen 112.

The mechanism for clamping the mold in a closed position includes a clamp piston 121 which slides in a clamp cylinder 123. The brake housing 119 is mounted on the end of the clamp piston 121.

As shown in FIG. 6, the brake housing 119 has a plurality of brake pad linings 136 which define the slots 117. Brake pistons 162 are mounted within a cylinder chamber 164 within the brake housing. As before, the pistons 162 move in a direction transverse to the direction of movement of the brake plates 132 and the moving platen 116. When activated, the brake pistons act on the brake linings 136 to grip the sides of the brake plates 132.

Fluid admitted to the space 165 in the brake housing causes all brake pistons to be simultaneously actuated and to grip the brake plates. Fluid is admitted to space 165 through flexible hose(s) 300 from a valve and pump arrangement (not shown). Due to this construction, the piston stroke is very short and the action is very fast. Stroke cylinders 301 mounted on clamp block 118 cause the platen 116 to move. Prior art clamps provided a shutheight adjustment means in order to accommodate different mold heights. This was done by moving the entire clamp block with respect to the base by using powered nuts acting on tiebar threads, or by providing additional travel in the main clamp cylinder. Both methods added cost and complication to the machine.

The instant invention can accommodate various mold shutheights without the need to adjust the clamp block position or provide additional travel to the clamp piston. Since the brake plates 132, can be gripped at any position and the clamp force transmitted through them to the mold, independent shutheight adjusting means are not required.

FIG. 7 shows the clamp in the open position with the brake pistons released and the brake plates free to move past the main clamp cylinder 123. Conventional stroke cylinders for moving the platen 116 between a mold open position and a mold closed position are not shown.

To apply a clamping force to the moving platen 116, the brake pistons are actuated to move against the brake pad linings causing the brake pad linings to grip the side surfaces of the brake plates. Then the clamping piston and cylinder are actuated to transmit the clamping force to the brake housing which in turn transmit it to the moving platen via the gripped brake plates. In this arrangement, the clamping force is directed to the moving platen.

Figure 8:
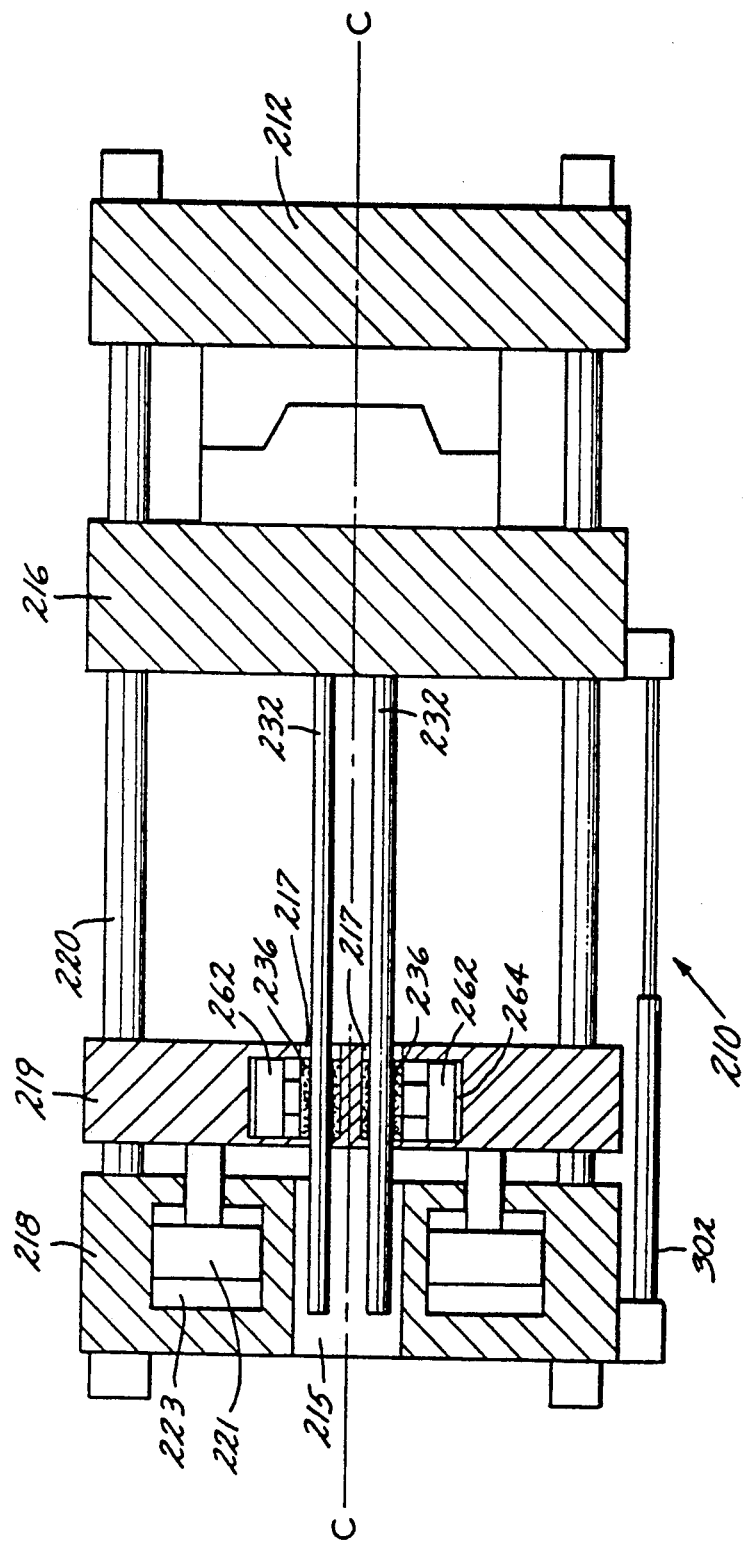
FIG. 8 illustrates an injection molding machine having an alternative embodiment of the clamping mechanism of the present invention.

FIG. 8 shows a molding machine 210 similar to that shown in FIGS. 6 and 7. The machine 210 includes a stationary platen 212 and a moving platen 216 which is movable between a mold open position and a mold closed position by a conventional stroke cylinders 302. The machine 210 also includes a clamp block 218, tiebars 220 extending between the clamp block 218 and the stationary platen 212 and a brake housing 219 slidable on said tiebars. The clamp block 218 may have a single central passageway through which the brake plates 232 may move.

As shown in FIG. 8, the brake plates 232 are positioned close to the center line C——C of the machine 210. Brake pad linings 236 are positioned within the brake housing 219 and define a number of passageways through which the brake plates can move.

The brake housing 219 further includes fluid actuated brake pistons 262 positioned within cylinders 264. Once again, the brake pistons 262 move in a direction transverse to the direction of movement of the brake plates and the moving platen.

The clamp block 218 is different in that it includes internal clamping cylinders 223 and clamping pistons 221. The clamping pistons each have one end affixed to the brake housing 219. When the main clamping pistons 221 and the clamping cylinders and the brake pistons are each actuated, the clamping pistons and the clamping cylinders act on the housing 219 to transmit the clamping force to the moving platen via the gripped brake plates.

This embodiment is advantageous in that it concentrates the clamping force applied to the moving platen at the center of the platen.

FIGS. 9 through 12 show yet another injection molding machine 310 utilizing the brake clamping mechanism of the present invention. The molding machine includes a stationary platen 312 and a moving platen 314. Both platens are mounted to a machine base 316. A mold A is formed between the platens 312 and 314 by mold halfs 322 and 324. A conventional injection unit 326 is provided for introducing molten plastic material into the mold when the mold is in a closed position. The machine further includes stroke cylinders 330 mounted between the two platens for causing movement of the moving platen 314.

The stationary platen 312 may be fixed to the base 316 using any suitable conventional means known in the art. The moving platen 314 slides on the machine base 316 on hardened ways 340. The hardened ways 340 may be firmed from conventional hardened steel, with bronze wear pads 342 on platen 314. The adjustable wear pads or plates 342 are provided to adjust the parallelism and alignment of the moving platen 314 with respect to the stationary platen 312.

This molding machine differs from those previously disclosed in that it does not have tiebars and a main clamp block. Instead of tiebars, the machine 310 has four brake plates 318 which are fixed to the moving platen 314 and slide through passageways 320 in the stationary platen 312. The passageways 320 have flat ground wear plates 360 mounted therein which facilitates maintenance and make alignment of the platens convenient.

Two brake housings 328 are provided to engage the brake plates 318. The brake housings are positioned on opposite sides of the injection unit. Each brake housing includes at least two pairs of brake pad linings 332 for defining passageways 334 through which the brake plates slide and for gripping the sides of the brake plates. Each brake housing further includes at least two piston-cylinder units 336 for causing said brake pad linings to move into engagement with the brake plates. As before, fluid introduced into the cylinder via a conduit not shown causes the piston to move against the brake pad linings.

Clamping piston-cylinder units 344 are provided in the brake housings 328. Each piston-cylinder unit comprises a cylinder 346 into which fluid can be introduced by conduits not shown and a movable piston 348 having one end attached to the stationary platen 312.

In operation, the brake pistons 338 are actuated so that the brake pad linings grip the sides of the brake plates and thereby lock the housings 328 to the brake plates 318. Thereafter, the clamping piston-cylinder units are actuated. When actuated they act on the stationary platen 312 so as to cause each brake housing to move away from the stationary platen and to cause the mold between the platens to become clamped. In this design, the brake plates 318 are put into tension by this clamping action and accordingly act like tiebars. Unlike the other designs disclosed herein, there is no risk of the brake plates buckling in compression. As a result they do not need to be made as stiff.

It should be noted that the brake plates completely disengage from the brake units and the brake pad linings when the mold is in an open position. This results in the use of shorter brake plates than otherwise would be required if tiebars and gripper bushings were used. This machine is particularly advantageous in that it is shorter than other machines due to the elimination of the main clamp block.

While the present invention has been discussed in the context of injection molding machines, the brake clamp mechanism of the present invention may be used in conjunction with vertical presses and the like which employ clamp mechanisms. It may also be useful to use the present invention in robots and fast moving product handling equipment.

It is apparent that there has been provided in accordance with this invention a brake clamp mechanism which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An injection molding machine comprising:
    a stationary platen and a moving platen;
    a mold between said platens;
    at least two brake plates mounted to said moving platen;
    a main clamp block having at least one slot and a brake housing having at least two slots through which said brake plates pass; and
    said brake housing being slidable on tiebars extending between said clamp block and said stationary platen.

2. The injection molding machine of claim 1 further comprising:
    a clamp piston for applying a clamping force to said moving platen; and
    said brake housing being mounted on an end of said clamp piston.

3. The injection molding machine of claim 2 wherein said brake housing includes at least two pairs of brake pad linings for gripping said brake plates and at least two brake pistons mounted with a cylinder, said brake pistons acting on said brake pad linings so as to cause said linings to grip side surfaces of said brake plates,
    whereby fluid admitted to said cylinder causes said brake pistons to be simultaneously actuated.

4. The injection molding machine of claim 3 further comprising:
    a main clamp cylinder surrounding said clamp piston; and
    said brake plates being free to move past the main clamp cylinder when said brake pistons are in a release position.

5. The injection molding machine of claim 1 further comprising four brake plates mounted to said moving platen and four slots for accommodating said brake plates in said main clamp block and said brake housing.

6. The injection molding machine of claim 1 wherein said brake plates are positioned close to the center line of said machine so as to direct a clamping force to the center of said moving platen.

7. The injection molding machine of claim 1 further comprising:
    brake pad linings within said brake housing for engaging side surfaces of said brake plates; and
    fluid actuated pistons within said housing for causing frictional engagement between said brake pad linings and said brake plate surfaces.

8. The injection molding machine of claim 7 further comprising:
    at least two clamping piston-cylinder units within said clamp block;
    each piston of said clamping piston-cylinder units being connected to said brake housing; and
    whereby a clamping force generated by said clamping piston-cylinder units acts on the brake housing and is transmitted via the brake linings and brake plates when they are in frictional engagement to the moving platen.

* * * * *

UNITED STATES PATENT AND TRADEMARK OFFICE
CERTIFICATE OF CORRECTION

PATENT NO. : 5,302,109
DATED : APRIL 12, 1994
INVENTOR(S) : PIERRE GLAESENER ET AL.

It is certified that error appears in the above-identified patent and that said Letters Patent is hereby corrected as shown below:

IN COLUMN 8, LINE 25, DELETE "WITH" AND INSERT --WITHIN--.

Signed and Sealed this

Sixteenth Day of August, 1994

Attest:

BRUCE LEHMAN

Attesting Officer

Commissioner of Patents and Trademarks